United States Patent [19]

McCormack

[11] Patent Number: 4,806,236
[45] Date of Patent: Feb. 21, 1989

[54] APPARATUS FOR UPFLOW ION EXCHANGE

[76] Inventor: Austin F. McCormack, 9424 Sherwood Glen, Dallas, Tex. 75228

[21] Appl. No.: 85,021

[22] Filed: Aug. 13, 1987

[51] Int. Cl.$^4$ ............................................. B01J 49/00
[52] U.S. Cl. ..................................... 210/94; 210/194; 210/290
[58] Field of Search ............... 210/94, 194, 196, 197, 210/269, 274, 275, 279, 290

[56] References Cited

U.S. PATENT DOCUMENTS

| | | | |
|---|---|---|---|
| 2,412,328 | 12/1946 | Felsecker | 210/24 |
| 2,666,741 | 1/1954 | McMullen | 210/24 |
| 2,785,803 | 3/1957 | Young | 210/134 |
| 3,062,739 | 11/1962 | Crits | 210/672 |
| 3,073,725 | 1/1963 | Popper et al. | 127/46 |
| 3,136,719 | 6/1964 | Serra | 210/190 |
| 3,163,597 | 12/1964 | Thrun | 210/30 |
| 3,355,018 | 11/1967 | Smith | 210/94 |
| 3,439,809 | 4/1969 | McPherren | 210/249 |
| 3,444,079 | 5/1969 | Bowers | 210/37 |
| 3,458,436 | 7/1969 | Martinola et al. | 210/20 |
| 3,497,069 | 2/1970 | Lindenthal et al. | 210/282 |
| 3,527,718 | 9/1970 | Coburn | 210/686 |
| 3,589,999 | 6/1971 | McRae et al. | 210/28 |
| 4,176,056 | 11/1979 | Grier | 210/20 |
| 4,193,867 | 3/1980 | Evans | 210/20 |
| 4,349,442 | 9/1982 | Barraque et al. | 210/675 |
| 4,369,114 | 1/1983 | Siegers | 210/661 |
| 4,400,278 | 8/1983 | Martinola | 210/678 |
| 4,528,101 | 7/1985 | Burke et al. | 210/677 |

Primary Examiner—Ivars Cintins
Attorney, Agent, or Firm—Richards, Harris, Medlock & Andrews

[57] ABSTRACT

A process and apparatus for the upflow ion exchange treatment of liquids in a single vessel containing a lower bed of cationic ion exchange resin and an upper bed of anionic ion exchange resin which are not separated by other physical devices but which can be separated by an inert resin. The anionic and cationic ion exchange resins in the vessel can be regenerated simultaneously in all of the preferred embodiments of the present invention. The preferred embodiments allow either countercurrent or cocurrent regeneration of the ion exchange resin beds.

18 Claims, 2 Drawing Sheets

APPARATUS FOR UPFLOW ION EXCHANGE

TECHNICAL FIELD

This invention relates to ion exchange apparatuses and processes and is more particularly concerned with an ion exchange apparatus and process in which liquids are treated by flowing them up through a single vessel containing a lower bed of cationic ion exchange resin and an upper bed of anionic ion exchange resin which are not separated by screens or other physical devices and which do not mix. The anionic and cationic ion exchange resins in the vessel can be regenerated simultaneously in the vessel by flowing regenerants simultaneously in each of the anionic and cationic resin beds.

BACKGROUND ART

Water and other liquids containing ionized material, such as soluble metal salts, are unsuitable for many industrial uses. While ions can be removed by either distillation or ion exchange giving liquids which approach theoretical purity, ion exchange is generally preferred as the most economical method.

In ion exchange, the metal ions in solution are removed by passing the untreated liquid through a bed or column of cationic ion exchange resin. The metal ions are replaced by hydrogen ions saturating the cationic resin as the liquid passes through the cationic resin bed. Likewise, the salt ions in solution are removed by passing the partially treated liquid through a bed or column of anionic ion exchange resin. The salt ions are replaced by the hydroxide ions saturating the anionic resin as the liquid passes through the anionic resin bed. The cationic and anionic ion exchange resins become exhausted and shrink through use, thereby requiring periodic regeneration. The cationic resins are regenerated by passing an acid regenerant, such as hydrochloric acid (HCl), through the cationic ion exchange resin bed, and the anionic resins are regenerated by passing an alkaline regenerant, such as sodium hydroxide (NaOH) through the anionic ion exchange resin bed. This regeneration typically causes expansion of the resins.

In the past, ion exchange has been accomplished using many different apparatuses and methods. In one type of apparatus, which is illustrated in the Bowers U.S. Pat. No. 3,444,079 and the Serra U.S. Pat. No. 3,136,719, the cationic resin was contained in one vessel or compartment and the anionic resin in another vessel or compartment. In this system, liquids are purified by passing them first through the vessel or compartment containing the cationic ion exchange resin and then through the vessel or compartment containing the anionic ion exchange resin. Ion exchange apparatuses of this type have several disadvantages: they require at least two vessels or sealed compartments for the purification of liquids along with the added complex of pipes and fittings to connect the vessels or compartments in series; and each resin is regenerated independently, requiring holding tanks for neutralization of spent regeneration solutions.

In another kind of apparatus, which is illustrated in the Lindenthal U.S. Pat. No. 3,497,069 and the Martinola U.S. Pat. No. 4,400,278, the cationic resin and anionic resin are contained in the same vessel, and maintained in distinct layers by the use of physical barriers such as screens or filters permeable by liquid but not by resin. Liquids are purified in these kinds of systems by passing the liquid first through a cationic resin layer and then through an anionic resin layer and so on until the liquid has passed through all layers. This kind of system is disadvantageous in that it requires the use of screens to prevent mixing of different layers of anionic and cationic resins; the layers closest to the untreated liquid inlet are relatively quickly exhausted and require frequent regeneration; and regeneration in place becomes increasingly difficult as the number of layers of resin increases, often requiring sequential regeneration of one layer at a time.

The separate bed systems of the prior art are many times followed by a mixed bed vessel to achieve increased purity. A single bed system is illustrated in the McMullen U.S. Pat. No. 2,666,741, wherein anionic and cationic resins are mixed forming a mixed bed within a single vessel. Flow direction of liquids to be treated by ion exchange is down within the vessel. Regeneration may be accomplished with the resins in the mixed state, as illustrated in the McRae et. al. U.S. Pat. No. 3,589,999, however, this requires relatively large amounts of regenerant solutions. The more efficient and commercial process is to separate the resins before regeneration, permitting the separate regeneration of each different kind of resin. It is well known in the art that by using cationic resins of a different specific gravity than the anionic resin, the mixed bed can be separated into roughly two sections, one cationic and one anionic, by air mixing the mixed bed prior to regeneration. The air mixing does not provide distinct separations of the two resins which means the cationic resin left in the anionic resin is damaged during regeneration and vice versa. Disadvantages of this kind of system include: the reduction or deterioration of ion exchange resins resulting from repeated air mixing; wasted time and water in the separation for regeneration and remixing operations; and the number of steps required in switching from the operation mode to the regeneration mode and back.

Thus, there has been a need to provide an anioncation unit which has reduced equipment costs, eliminates the need for large storage vessels for holding the regenerant wastes for neutralization purposes, and requires less floor space.

The present invention provides an apparatus and method for ion exchange which is accomplished in a single vessel using continually compacted beds of anionic and cationic resins which, because of their difference in specific gravity, remain separate without the need for a physical barrier during use and which are simultaneously regenerated during regeneration, without further separation or removal of the resins thereby substantially reducing the number of steps required for operation and regeneration as well as reducing the deterioration of the resins caused by prior art methods requiring repeated mixing and separation.

SUMMARY OF THE INVENTION

In one aspect, the apparatus of the present invention is constructed from a generally cylindrical, sealed vessel having at least one lower inlet conduit mounted on the lower portion of the vessel and extending from the exterior to the interior, a middle outlet conduit mounted on the middle portion of the vessel and extending from the exterior to the interior and at least one upper conduit mounted on the upper portion of the vessel and extending from the exterior to the interior Attached to the lower inlet conduit on the inside of the vessel is a distributor. Attached to the middle outlet conduit on the inside of the vessel is a regenerant collector. Attached to the upper conduit on the inside of the vessel is a distributor-collector. A bed of cationic ion exchange resin completely fills the interior space of the vessel from the bottom to the immediate vicinity of the regenerant collector. A bed of anionic ion exchange resin rests directly on the cationic bed and fills the remaining interior space of the vessel to the top of said vessel. Untreated liquid enters into the vessel through the lower distributor, passing up through the cationic resin first, then through the anionic resin, then exiting the vessel as treated water through the upper distributor-collector. The cationic and anionic resins do not mix because flow is controlled to avoid turbulence and to compress the resins against the top of the tank, and because the cationic resin selected has greater specific gravity than the anionic resin. When the resins become exhausted, regeneration is accomplished by introducing anionic regenerant into the top of the vessel through the upper distributor-collector and cationic regenerant into the bottom of the vessel through the lower distributor, the regenerants being simultaneously removed from the vessel through the regenerant collector.

In another aspect of the apparatus of the present invention, a neutral resin bed is disposed between the cationic resin bed and the anionic resin bed, and also surrounds the regenerant collector. As the cationic and anionic resins shrink during use and expand during regeneration, the position of the neutral bed will change, moving up or down, but the neutral bed will be of sufficient width to always surround the regenerant collector. This provides a non-reactive zone for the mixing and withdrawal of regenerant solutions without degrading or damaging the cationic resin by contact with the anionic regenerant and the anionic resin by contact with the cationic regenerant, or by exposure to somewhat elevated temperatures at the site of neutralization.

In another aspect of the apparatus of the present invention, a recirculation system is placed between the upper conduit and lower inlet conduit of the vessel. The recirculation system comprises valves, a pump and conduits. A first valve means having at least two positions is attached to the upper conduit and a first pipe connects the inlet connector on the recirculation pump to the first valve means. A second valve means having at least two positions is attached to the lower inlet conduit and a second pipe connects the outlet connection on the recirculation pump to the second valve means. In the first valve position, the valve means allows liquid flow from an outside source into the vessel through the distributor, up through the resin beds and out of the vessel through the distributor-collector. In the second valve position, the outside source of liquid is shut off, the output of treated liquid is shut off, and the treated liquid present in the vessel is continuously recirculated upflow through the vessel by the action of the recirculation pump. In other selected positions the valve means can be adjusted to provide any desired degree of recycle during operation. The recirculation system is advantageous in start up in that it allows the resin to be compacted by the upward flow of the water and also permits water to be recirculated until desired water quality is achieved and then treatment operation can begin. Further, the recirculation system can be used in normal operation to maintain a sufficient flow rate in the vessel to keep the bed compacted by a predetermined amount of recycle. The valve means may be a single valve or is more commonly two or more properly placed valves.

In another aspect the process of the present invention involves treating liquids by ion exchange by passing them upflow through a single vessel containing a lower bed of cationic resin and an upper bed of anionic resin to form treated liquid. The process also involves simultaneously regenerating the resin beds, when exhausted, in the vessel by passing anionic regenerant from the top of the vessel down through the anionic resin bed and cationic regenerant from the bottom of the vessel up through the cationic resin bed, and removing the regenerants simultaneously from the vessel through the regenerant collector.

In another aspect the vessel of the present invention can be constructed so as to provide a distributor for cationic regenerant above the cationic bed to allow for cationic regenerant distribution at the top portion of the cation section of the vessel and a separate cationic collector at the bottom of the cationic bed Through this construction cationic regenerant can be flowed in a counter current manner and better regeneration of the cationic resin is achieved

BRIEF DESCRIPTION OF THE DRAWINGS

A better understanding of the invention and its advantages will be apparent from the Detailed Description taken in conjunction with the accompanying drawings in which.

DETAILED DESCRIPTION OF THE INVENTION

Figure 1:
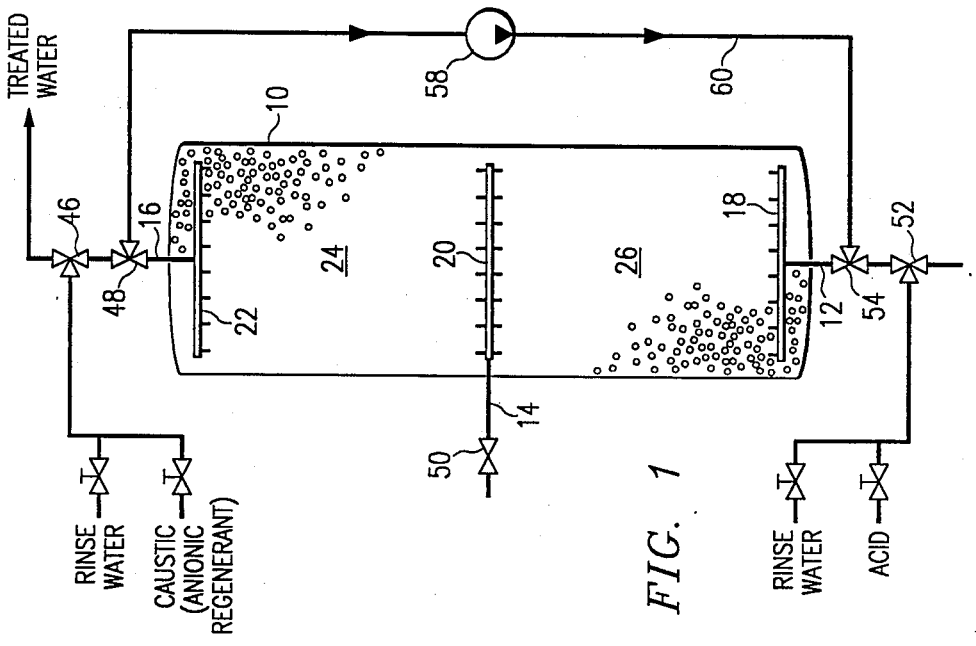
FIG. 1 is a schematic view illustrating an embodiment of apparatus according to the present invention in which the regenerants are removed through the same collector to provide counter current regeneration of the anionic resin and cocurrent regeneration of the cationic resin.

FIG. 1 shows an ion exchange apparatus useful in the present nnvention where the apparatus consists of a generally cylindrical, sealed vessel 10 containing a lower inlet conduit 12, a middle outlet conduit 14, and an upper conduit 16, all conduits extending from the exterior to the interior of vessel 10. A distributor 18 is attached to the lower inlet conduit 12 inside the vessel 10 for the introduction of untreated liquid in the operational mode and for introduction of cationic regenerant in the regenerating mode. A regenerant collector 20 is attached to the middle outlet conduit 14 inside the vessel for the removal of regenerant solutions during the regenerating mode. A distributor-collector 22 is attached to the upper conduit 16 inside the vessel for the removal of treated water during the operational mode and for the introduction of anionic regenerants in the regenerating mode. The interior space of vessel 10 is filled from the bottom to slightly above the location of the regenerant collector 20 with cationic ion exchange resin, forming a cationic resin bed 24. The cationic ion exchange resin will shrink somewhat as the resin becomes exhausted through use, resulting in a change in the position of the bed in relation to the regenerant collector 20. The remaining interior space of vessel 10 is filled from the top of the cationic resin bed 24 to the top of the vessel with anionic ion exchange resin to form the anionic resin bed 26. By including sufficient excess cationic resin above the regenerant collector 20 initially, after shrinkage of the resins the regenerant collector 20 will be at the interface of the cationic and anionic resin beds.

In the preferred embodiment a bed of neutral resin is disposed between the cationic resin bed 24 and the anionic resin bed 26 such that it surrounds the regenerant collector 20. This embodiment minimizes the exposure of each of the resins to the regeneration fluid used for the other resin thereby minimizing damage of the anionic resin from the cationic resin regenerant and vice versa.

Figure 2:
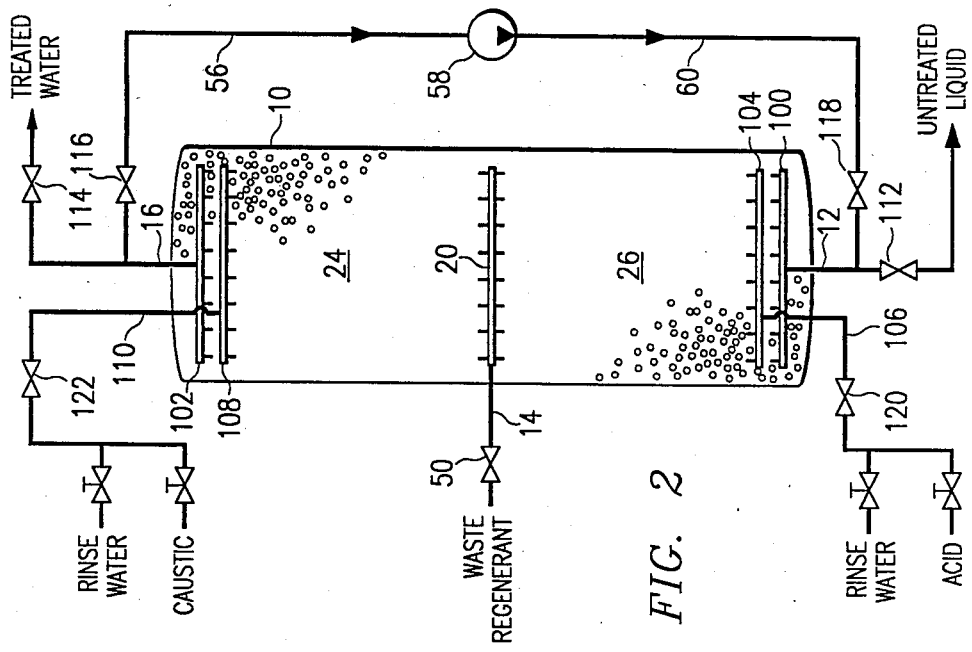
FIG. 2 is a schematic view illustrating another embodiment of the apparatus of the present invention in which counter current regeneration of the anionic resin can be achieved and cocurrent regeneration of the cationic resin is achieved.

FIG. 2 illustrates a vessel as shown in FIG. 1 except that distributors 100 are used for distribution of treated liquid and any recycle, and collector 102 is used for collection of treated liquid. Because the flow rate of regenerants can be substantially less than the flow rates of the liquid treated, the same distributor or collector-distributor, such as elements 18 and 22 (shown in FIG. 1), may not provide for the adequate distribution of regeneration across the entire cross section of the resin bed. In such a case a separate distributor 100 is provided for liquid to be treated and a separate distributor 104 is provided for cationic regenerant. Distributor 104 is connected to the outside of vessel 10 by cationic regenerate conduit 106. Treated liquid is collected by collector 102, and distribution of anionic regenerant is made through distributor 108, which is connected to the source of regenerant via conduit 110.

Figure 3:
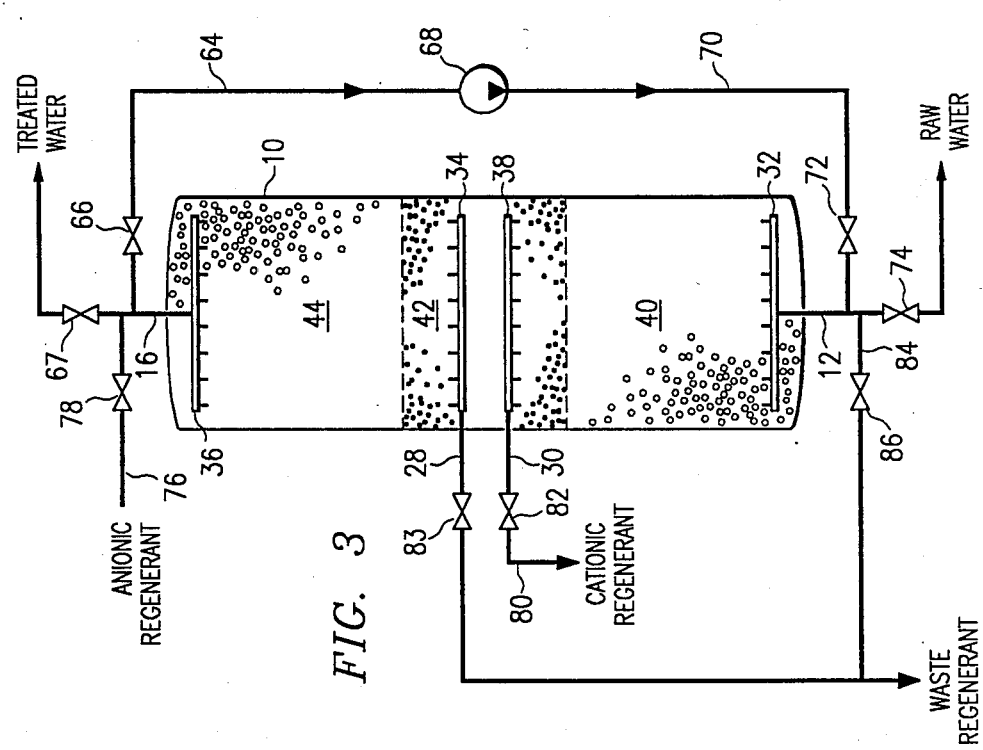
FIG. 3 is a schematic view illustrating another apparatus according to the present invention in which counter current regeneration of both resin beds can be achieved.

FIG. 3 shows another ion exchange apparatus useful in the present invention where the apparatus consists of a generally cylindrical, sealed vessel 10 containing a lower inlet conduit 12, a middle collector conduit 28, an upper conduit 16, and a middle distributor conduit 30, all conduits extending from the exterior to the interior of vessel 10. A lower distributor-collector 32 is attached to the lower inlet conduit 12 inside the vessel 10 for the introduction of untreated liquid in the operational mode and collection of cationic regenerant in the regenerating mode. The apparatus can be modified by providing a separate distributor or collector for each mode attached to its own separate conduit to accommodate lower flow rates of regenerants versus the liquid to be treated in a fashion similar to that illustrated in FIG. 2. A regenerant collector 34 is attached to the middle collector conduit 28 inside the vessel for the removal of anionic regenerant solutions during the regenerating mode. An upper distributor-collector 36 is attached to the upper conduit 16 for the removal of treated water during the operational mode and for the introduction of anionic regenerants in the regenerating mode. A cationic regenerant distributor 38 is attached to middle distributor conduit 30 to provide for the counter current flow of cationic regenerant.

The interior space of vessel 10 is filled from the bottom to slightly below the location of the cationic regenerant distributor 38 with cationic ion exchange resin, forming a cationic resin bed 40. The cationic ion exchange resin will shrink somewhat as the resin becomes exhausted through use, resulting in a change in the position of the bed in relation to the cationic regenerant distributor 38. In the preferred mode the interior space of vessel 10 is filled from the top of the cationic resin bed 40 to slightly above the top of the anionic regenerant collector 34 with inert resin forming bed 42. From the top of the inert bed 42 the vessel 10 is filled with anionic ion exchange resin to form the anionic resin bed 44. In the preferred mode sufficient inert resin is used above and below the collector 34 and distributor 38 such that the inert resin surrounds the collector 34 and distributor 38 both before and after shrinkage of the exchange resins. As explained with reference to FIG. 1 an inert resin bed is not required and the anionic resin can be placed directly on the cationic resin.

In operation, if the flow rate of the liquid to be treated is sufficient, the resins will be compacted or pressed together such that channelization does not occur. The flow rate of the liquid to be treated can be sufficient in itself. For example, when normal city water is being treated the water can have a sufficient rate. If the rate is not sufficient, a recycle pump can be provided to assure a sufficient flow rate to compact the bed.

Outside vessel 10 in FIG. 1 is attached on the upper conduit 16 an upper conduit valve means 46 having two positions, the first position for the discharge of treated liquids and the second position for the entry of anionic regenerants. A first recirculation valve means 48 is attached to the upper conduit 16 between the upper conduit valve means 46 and the vessel 10, having variable positions, a first position for opening the conduit for the entry or exit of liquid selected by the upper conduit valve means 46 and a second position for closing the conduit and diverting treated liquids to the recirculation system. Variable positions in between the first and second position permits a selected amount of recycle during operation. Any valve means can be used, for example the combination of valves 46 and 48 of FIG. 1 can be replaced by the valve arrangement shown in FIG. 3 of valves 67, 78 and 66 shown in FIG. 3.

On the middle outlet conduit 14 is attached a middle outlet valve means 50 having two positions, the first position being the open position allowing regenerants to be removed from vessel 10, and the second position being the closed position.

On the lower inlet conduit 12 is attached a lower inlet valve means 52 having two positions, the first position for the entry of untreated liquids and the second position for closing off the untreated liquids and permitting entry of cationic regenerants. A second recirculation valve means 54 is attached to the lower inlet conduit 12 between the lower inlet valve means 52 and the vessel 10, having variable positions, a first position for the entry of liquid selected by the lower inlet valve 52 and a second position for closing off the liquid selected by lower inlet valve means 52 and permitting entry only of recirculated liquids from the recirculation system. Variable positions between the first and second positions allows for predetermined amount of recycle.

Attached to the first recirculation valve means 48 is a first recirculation pipe 56 which is, in turn, connected to the recirculation pump inlet connector on the recirculation pump 58. Attached to the recirculation pump outlet connector on the recirculation pump 58 is a second recirculation pipe 60 which is, in turn, connected to the second recirculation valve means 54. The valve means again can be any suitable arrangement of valves.

The vessels of the present invention can be equipped with a viewing window or windows. The windows allow the beds to be observed to assure the bed is compacted and to determine whether any resin migration is occurring. The windows can also provide a means of observing the shrinkage of the resin.

The present invention is an economical alternative to existing systems. By combining both the anionic and cationic ion exchange resins in one vessel, the additional vessels, pipes, valves and fittings required for complete purification using single resin vessels are eliminated. The present invention also exhibits advantages over existing systems which incorporate two or more fixed beds of anionic and cationic resins in one vessel: In the present invention physical barriers to divide the different resin beds are not required since resins are selected which have different specific gravities and flow is adjusted to compact each resin in a distinct layer against the top of the vessel; and, by using a regenerant collector at the interface of the two active beds, regeneration can be accomplished simultaneously without the need for several holding and neutralizing tanks, along with their associated pipes, valves and fittings, for spent regenerants. Finally, the present invention exhibits advantages over existing mixed bed systems since the cycle of mixing the resins during use, and separating the resins for regeneration, which results in a shorter life span due to deterioration of the resins, is not required in the present invention since the resins remain in distinct layers during both use and regeneration.

As can be seen in FIG. 1 regeneration of the cationic bed 24 is accomplished in a cocurrent manner and regeneration of the anionic bed 26 is effected in a countercurrent manner. The most effective regeneration is accomplished with a countercurrent regeneration. Thus, although the cocurrent regeneration of the cationic bed 24 is not the most desirable type of regeneration it is sufficient for many applications and is desirable in the present invention in that it eliminates extra piping and simplifies procedures. The vessel of the present invention can be modified so as to provide for the countercurrent regeneration of both the anionic resin bed and the cationic resin as shown in FIG. 3.

FIG. 2 illustrates an alternate embodiment of the apparatus shown in FIG. 1. In this embodiment the elements having the same numbers as in FIG. 1 function in the same manner. In the operational mode, liquid to be treated enters through valve 112 into conduit 12 and is distributed via distributor 100. The untreated liquid flows upward through the cationic resin bed 24 and anionic resin bed 26. The resulting treated liquid is collected by collector 102 and exits via conduit 16 and valve 114. Complete or partial recycle is achieved by opening or closing valves 116 and 118.

In the regeneration mode valves 112, 114, 116, and 118 are closed. Valves 120 and 122 are opened to permit flow of cationic regenerant into conduit 106 which is distributed by distributor 104, and flow of anionic regenerant into conduit 110 which is distributed by distributor 108. The regenerants are collected by collector 20 and exit via conduit 14 and valve 50.

FIG. 3 illustrates a vesssel adapted for countercurrent regeneration of both the anionic and cationic regenerant. In FIG. 3, there is also illustrated valve means different than the valves described in FIG. 1 to control flow. Intersecting with conduit 16 is inlet recycle pipe 64. Control into inlet recycle 64 is controlled by inlet recycle valve means 66. Pipe 64 is connected with recycle pump 68 and recycle is discharged from pump 68 into the recycle outlet pipe 70. Flow from recycle outlet pipe 70 into conduit 12 is controlled by valve means 72. Flow of water to be treated into conduit 12 is controlled by inlet water control valve 74. In operation raw water is fed through conduit 12 through the exchange resin and exits through conduit 16. A portion of the flow in conduit 16 can be recycled if desired through pipes 64 and 70.

In the regeneration mode anionic regenerant is flowed through line 76 and valve 78, through conduit 16 and into the top of vessel 10. The regenerant is then extracted through collector 34 and outlet conduit 28 and valve 83. The cationic resin is regenerated by passing cationic regenerant through line 80 and valve 82 into distributor 38 and downward through the cationic resin bed 40. The spent regenerant is collected by collector distributor 32 flowed through conduit 12 and removed via pipe 84 and valve 86. The spent regenerant of the cationic and anionic regenerant may then be combined.

Channelization can be a problem with all known ion-exchange systems. When channelization occurs, much of the liquid passing through the vessel does not contact the resin adequately and, therefore, escapes only partially treated. The present invention uses the flow of liquid up through the vessel to compact the resin beds against the top of the vessel, preventing channelization in most cases. However, if the upflow rate is below the amount necessary to compact the bed satisfactorily, channelization may occur. A recirculation system, as shown in FIGS. 1, 2 and 3, can be utilized to maintain the flow and the compaction of the beds when necessary during operation.

FIGS. 1, 2 and 3 illustrate embodiments of the present invention wherein the beds are compacted during use by the upflow of the liquids being treated through the vessel. The anioiic resin selected will have a relatively low specific gravity and will be compacted against the top of the vessel by the flow of liquid through it. The cationic resin selected will have a higher specific gravity and will be compacted against the resin bed above it. A flow rate of above about 3 gallons per minute per square foot of cross sectional area and above will maintain compaction. If a neutral resin bed is used, the neutral resin selected should have a specific gravity intermediate to the anionic resin and the cationic resin. In general the preferred flow rates of liquid to be treated are between about 6 and about 10 gallons per minute per square foot of cross sectional area. If the delivery rate of the source of liquid is insufficient the recycle feature can be employed to maintain a sufficient flow rate to assure compaction. The use of a recirculation pump is also advantageous in that it permits periodic use of the ion exchange apparatus without start up water quality problems because water in the unit can be recycled until desired quality is achieved before discharging it.

As shown in FIG. 1, in the operational mode, the upper conduit valve means 46 is set to the first position for the discharge of treated liquids, the lower inlet valve means 52 is set to the first position for the entry of untreated liquids, the middle outlet valve 50 is set to the second (closed) position. If a recirculation system is used, the first recirculation valve means 48 is set to the first position for the exit of liquid through the upper conduit valve means 46, and the second recirculation valve means 54 is set to the first position for the entry of liquids selected from the lower inlet valve means 52. Thus, when untreated liquid is applied to the untreated liquid inlet it flows into the apparatus through the distributor 18, passing through the cationic resin bed 24, the neutral resin bed (if present), and the anionic resin bed 26 to form the treated liquid which flows out of the apparatus through the distributor-collector 22.

During initial startup, or following regeneration, when the beds have been permitted to settle, it will be necessary to compact the beds against the top of the vessel before the operational mode is commenced. This is accomplished by slowly adjusting the flow rate to compact first the bed of resins having the lowest specific gravity followed by the beds with resins of increasingly greater specific gravity. This can be accomplished by adjusting the flow of the untreated liquid, by using the recirculation pump, or a combination of both, to compact the resin beds.

The recirculation system is controlled by adjusting the first recirculation valve means 48 and the second recirculation valve means 54 to divert the desired flow of liquid through the recirculation system. Treated liquid flows through the distributor-collector 22 and the recycled portion is diverted through the first recirculation valve means 48 into the first recirculation hose or pipe 56, and into the recirculation pump 58. The recirculation pump 58 forces the liquid through the second recirculation hose or pipe 60, the second recirculation valve means 54, the lower inlet conduit 12, the distributor 18 and into the bottom of the vessel, flowing up through the beds to the distributor-collector 22, repeating the cycle until the recirculation mode is discontinued.

By monitoring the quality of the treated liquid, one can determine when regeneration should be conducted. Any method known in the art to monitor the quality of the liquid can be used. When water is being treated it is usually done by measuring conductance.

During the regeneration mode, the beds are allowed to settle. Upper conduit valve means 46 is set to allow the introduction of anionic regenerant, the lower inlet valve means 52 is set to allow the introduction of cationic regenerant, the middle outlet valve means 50 is set to the first (open) position, the first recirculation valve means 48 is set to close off the recirculation system and open the upper conduit to flow of regenerant and the second recirculation valve means 54 is positioned to open the lower inlet conduit to the cationic regenerant. In this mode, cationic regenerants such as hydrochloric acid (HCl), sulfuric acid (H$_2$SO$_4$) or other acids known to be effective cationic regenerants pass into the system through the distributor 18, flowing up through the cationic resin bed 24 until it reaches the regenerant collector 20, which begins to remove it from the system preventing it from rising any higher. Anionic regenerant, such as solutions of sodium hydroxide (NaOH) or other alkaline compounds, such as, soda ash, known to be effective anionic regenerants, pass into the system through the distributor-collector 22 flowing down through the anionic resin bed 26 until it reaches the regenerant collector 20, at which point the collector 20 removes both cationic and anionic regenerants. Both regenerants continue to flow into the vessel 10 until regeneration of the resins is complete, at which point valves 52 and 46 are set to their first position shutting off the flow of regenerants as described above. Remaining regenerants are flushed from the unit by flowing a rinse up through the distributor 18 and down through the distributor-collector 22 forcing the residual regenerants out through the regenerant collector 20.

Once regeneration has been accomplished it is desirable to rinse the regenerants from the beds. This is done by flowing rinse water through the regenerant collectors and collecting it at the regenerant collector in FIGS. 1 and 2 or regenerant collectors in FIG. 3.

This simultaneous regeneration of resins represents a significant advantage over prior art apparatuses utilizing separate cation and anion vessels or beds: neutralization occurs predominantly in situ eliminating the need for separate containers for used regenerants and a subsequent neutralization step; and, regeneration time is decreased, permitting the unit to be put back into use more quickly.

A bed of neutral resins completely surrounding the regenerant collector 20, and disposed between the anionic resin bed 26 and the cationic resin bed 24 may be used with any of the embodiments of the present invention. This forms a neutral zone during regeneration which prevents exposure of the resins of either active bed to the regenerants of the other bed, avoiding degradation of or damage to the active resins by contamination or by heat of reaction.

In the apparatus of FIG. 3 regeneration is accomplished by closing valves 72, 74, 66 and 67, then valves 78 and 82 are opened to allow flow of regenerants through conduits 30 and 16, which are distributed by distributors 36 and 38. The spent regenerants are collected by collector 34 and distributor-collector 32 and removed by opening valves 83 and 86.

A number of view windows are desirable. The viewing windows are of any substantially transparent material such as glass or plastic. An upper view window is used in order to assure that the ionic resin is compacted against the upper distributor-collector. The middle viewing window should be of sufficient size to permit viewing of the resin interfaces between the cationic and anionic resin, and also the inert resin, as well as, the distributors and collectors located at the middle.

The vessel can be constructed of any suitable material. Preferably it is constructed of steel which has been rubber lined. Rubber lined steel is preferable in that the rubber tends to flow into the pores of the steel thus making a noncorrosive surface which adheres tightly to the steel walls. Other types of nonreactive coatings such as plastics and teflon may also be used.

The distributors and collectors can be constructed of polyvinyl chloride pipe or of stainless steel, such as 316 stainless steel. Preferably the collectors are of the header and lateral design rather than the radial hub design. A header and lateral design allows for the better distribution and collection of fluids across a large diameter vessel. Preferably inlets or outlets of the collectors or distributors are spaced so as to provide at least one opening for each square foot of cross sectional area of the vessel.

Any suitable resins known in the art can be utilized. Preferably, high strength bead type resins such as condensate grade rated for 50 gallons per minute are employed. The resins need to be a different specific gravity sufficient to permit the beds to be separately maintained. Suitable cationic exchange resins include the gel type or the bead type, such as sulphonated polystyrene cross-linked with divinyl benzene sold by Rohm & Haas under the tradenames Amberlite IR-120 and IR-200; and by Dow Chemical under the tradenames HCR-S, MSC-1; or by Ionac under the tradenames C-267 and CFP-110. Suitable anionic exchange resins include gel or bed type porous quaternary ammonium cross linked polystyrene, sold by Rohm & Haas under the tradename IRA-402 and IRA-900; or by Dow Chemical under the tradenames SBR-P and MSA-1; or by Ionac under the tradenames ASB-1P and A-641. Preferably the resins are of distinct and different colors such that visual observation of migration can be observed.

Any suitable type of valves or combinations of valves may be utilized. It has been found that valves of the diaphragm and dam type are particularly well suited. Butterfly valves are also very useful. Other type valves of course can be used. The valves should be constructed to be corrosion resistant. Saunders valve are also useful.

Piping may be of any suitable piping. Pipes can be made of polyvinylchloride, other types of plastic, rubber lined steel, or Saran lined steel.

The recirculation pump may be of any suitable type known in the art. Generally centrifugal pumps are preferred.

The regenerant solutions useful in the present invention are well known in the art and are typically dilute acid or base solutions. For example, sulfuric acid is generally utilized in a concentration of about 2% of an aqueous solution at a flow rate of about 0.5 gallons per minute per cubic foot of resin. The sodium hydroxide solution is generally about 4% to about 5% and at a flow rate of approximately 0.5 gallons per minute per cubic foot. It is preferred that the regeneration solutions be fed to the vessel through positive displacement or controlled volume diaphragm pumps to assure accurate metering of those solutions. The flow rate of regenerants is typically in the range from about 0.5 gallons per minute per cubic foot of resin to about 2.0 gallons per minute of cubic foot of resin. Flow rates and concentration can of course be varied as known in the art.

The sizing of the vessel is known to those skilled in the art. Knowing the load to be placed upon the unit, the quality of the raw feedwater, the desired length of service prior to regeneration, and the desired purity, one can determine the quantity of resins to be utilized. Thereafter, the vessel is designed such that each ion exchange bed has a minimum depth of about two feet to a maximum depth of about six feet. While the ion exchange beds may be deeper it is desirable they not be less than the two feet minimum depth. The inert resin bed, if employed, should be a sufficient depth to surround the middle distributors and collectors.

While the preferred embodiments of the present invention have been described in detail, and shown in the accompanying Drawings, it will be evident that various further modifications are possible without departing from the scope of the invention.

I claim:

1. An apparatus for treating liquids by ion exchange, comprising:
   (a) a sealed vessel of generally cylindrical shape having a lower portion including a bottom, a middle portion, and an upper portion including a top;
   (b) a lower inlet conduit mounted on said lower portion of said vessel and extending from the exterior of said vessel to the interior;
   (c) a middle outlet conduit mounted on said middle portion of said vessel and extending from the exterior of said vessel to the interior;
   (d) an upper conduit mounted on said upper portion of said vessel and extending from the exterior of said vessel to the interior;
   (e) a liquid distributor attached to said lower inlet conduit inside said vessel for introducing the liquid to be treated into the bottom of said vessel in the operation mode and for distributing cationic regenerant in the regeneration mode;
   (f) a liquid distributor-collector attached to said upper conduit inside said vessel for removing treated liquid from the top of said vessel in the operational mode and for distributing anionic regenerant in the regeneration mode;
   (g) a regenerant collector attached to said middle outlet conduit inside said vessel for removing said anionic and cationic regenerants from said vessel;
   (h) a bed of cationic ion exchange resin filling the interior space of said vessel from the bottom of said vessel to approximately the location of said regenerant collector means; and
   (i) a bed of anionic ion exchange resin resting directly on said bed of cationic ion exchange resin and completely filling the remaining interior space of said vessel from approximately the location of said regenerant collector means to the top of said vessel.

2. The apparatus of claim 1 wherein said cationic ion exchange resin is of a different color than said anionic ion exchange resin.

3. The apparatus of claim 1 wherein said vessel contains a viewing window of substantially transparent material in said middle portion to permit viewing of the area proximate to the middle regenerant collector.

4. The apparatus of claim 1 further comprising: a recycle loop comprising,
   (i) a first recycle valve means connected to said upper conduit to divert a predetermined amount of recycle;
   (ii) an inlet recycle conduit connected to first recycle valve means;
   (iii) a recycle pump connected to said inlet recycle conduit,
   (iv) an exit recycle conduit connected to the discharge outlet of said recycle pump, and
   (v) a second recycle valve means connecting said exit recycle conduit with said lower inlet conduit.

5. The apparatus of claim 4 wherein said cationic ion exchange resin is of a different color than said anionic ion exchange resin.

6. The apparatus of claim 5 wherein said vessel contains a viewing window of substantially transparent material in said middle portion to permit viewing of the area proximate to the middle distributor.

7. The apparatus of claim 6 wherein said vessel contains a viewing window of substantially transparent material at the top of vessel to permit viewing of the area proximate to said liquid distributor-collector attached to said upper conduit.

8. An apparatus for treating liquids by ion exchange, comprising:
   (a) a sealed vessel of generally cylindrical shape having a lower portion including a bottom, a middle portion, and an upper portion including a top;
   (b) a lower inlet conduit mounted on said lower portion of said vessel and extending from the exterior of said vessel to the interior;
   (c) a first middle outlet conduit mounted on said middle portion of said vessel and extending from the exterior of said vessel to the interior;
   (d) a second middle outlet conduit mounted on said middle portion of said vessel and extending from the exterior of said vessel to the interior;
   (e) an upper conduit mounted on said upper portion of said vessel and extending from the exterior of said vessel to the interior;

(f) a liquid distributor-collector attached to said lower inlet conduit inside said vessel for introducing and distributing the liquid to be treated into the bottom of said vessel and for collection of cationic regenerant during regeneration;

(g) a liquid distributor-collector attached to said upper conduit inside said vessel for collecting and removing the treated liquid from the top of said vessel and for distributing anionic regenerant during regeneration;

(h) an anionic regenerant collector attached to said first middle outlet conduit inside said vessel for removing anionic regenerant solutions from said vessel;

(i) a cationic regenerant distributor attached to said second middle conduit for introduction and distribution of cationic regenerant; j) a bed of cationic ion exchange resin completely filling the interior space of said vessel from the bottom of said vessel to slightly below the location of said cationic regenerant distributor attached to said second middle outlet conduit; (k) a bed of inert resin resting directly on said bed of cationic resin and completely filling the interior space of said vessel to a point slightly above said anionic regenerant collector attached to said first middle outlet conduit; and (l) a bed of anionic ion exchange resin resting directly on said bed of inert ion exchange resin and completely filling the remaining interior space of said vessel to approximately the location of said liquid distributor-collector at said top of said vessel.

9. The apparatus of claim 8 further comprising:
a recycle loop comprising,
 (i) a first recycle valve means connected to said upper conduit to divert a predetermined amount of recycle;
 (ii) an inlet recycle conduit connected to said first recycle valve means;
 (iii) a recycle pump having an inlet and outlet, said inlet connected to said inlet recycle conduit,
 (iv) an exit recycle conduit connected to said outlet of said recycle pump, and
 (v) a second recycle valve means connecting said exit recycle conduit with said lower inlet conduit.

10. An apparatus as in claim 9 wherein said cationic ion exchange resin is of a different color than said anionic ion exchange resin, and both ion exchange resins are of a different color than said inert resin.

11. The apparatus of claim 9 wherein said vessel includes a viewing window of substantially transparent material in said middle portion to permit viewing of the area proximate to said middle cationic regenerant distributor and said anionic regenerant collector.

12. The apparatus of claim 8 wherein said vessel includes a viewing window of substantially transparent material at said top of said vessel to permit viewing of the area proximate to said liquid distributor-collector attached to said upper conduit.

13. An apparatus for treating liquids by ion exchange comprising:
 (a) a sealed vessel of generally cylindrical shape having a lower portion including a bottom, a middle portion, and an upper portion including a top;
 (b) a first lower inlet conduit mounted on said lower portion of said vessel and extending from the exterior of said vessel to the interior;

(c) a second lower inlet conduit mounted on said lower portion of said vessel and extending from the exterior of said vessel to the interior;

(d) a middle outlet conduit mounted on said middle portion of said vessel and extending from the exterior of said vessel to the interior;

(e) a first upper conduit mounted on said upper portion of said vessel and extending from the exterior of said vessel to the interior;

(f) a second upper conduit mounted on said upper portion of said vessel and extending from the exterior of said vessel to the interior;

(g) a liquid collector attached to said first upper conduit inside said vessel for removing the treated liquid from said top of said vessel;

(h) an anionic regenerant distributor attached to said second upper conduit for introducing anionic regenerant into said top of said vessel;

(i) a cationic regenerant distributor attached to said second lower inlet conduit inside said vessel for introducing cationic regenerant solutions into said bottom of said vessel;

(j) a liquid distributor attached to said first lower inlet conduit inside said vessel for introducing the liquid to be treated into said bottom of said vessel;

(k) a regenerant collector attached to said middle conduit inside said vessel for removing said anionic and cationic regenerants from said vessel;

(l) a bed of cationic exchange resin filling the interior space of said vessel from said bottom of said vessel to approximately the location of said regenerant collector; and (m) a bed of anionic exchange resin resting directly on said bed of said cationic exchange resin and completely filling the remaining interior space of said vessel from approximately the location of said regenerant collector to the top of said vessel.

14. The apparatus of claim 13 wherein said cationic ion exchange resin is of a different color than said anionic ion exchange resin.

15. The apparatus of claim 13 wherein said vessel contains a viewing window of substantially transparent material in said middle portion to permit viewing of the area proximate to said regenerant collector.

16. The apparatus of claim 13 further comprising a recycle loop comprising:
 (i) a first recycle valve means connected to said first upper conduit to divert a predetermined amount of recycle;
 (ii) an inlet recycle conduit connected to said first recycle valve means;
 (iii) a recycle pump having an inlet and outlet, said inlet connected to said inlet recycle conduit;
 (iv) an exit recycle conduit connected to said outlet of said recycle pump; and
 (v) a second recycle valve means connecting said exit recycle conduit with said first lower inlet conduit.

17. An apparatus for treating liquids by ion exchange, comprising:
 (a) a sealed vessel of generally cylindrical shape having a lower portion including a bottom, a middle portion, and an upper portion including a top;
 (b) a lower inlet conduit mounted on said lower portion of said vessel and extending from the exterior of said vessel to the interior of said vessel and extending from the exterior said vessel to the interior;

(c) a middle outlet conduit mounted on said middle portion of said vessel and extending from the exterior of said vessel to the interior;

(d) an upper conduit mounted on said upper portion of said vessel and extending from the exterior of said vessel to the interior;

(e) a liquid distributor attached to said lower inlet conduit inside said vessel for introducing the liquid to be treated into the bottom of said vessel in the operation mode and for distributing cationic regenerant in the regeneratsion mode;

(f) a liquid distributor-collector attached to said upper conduit inside said vessel for removing treated liquid from the top of said vessel in the operational mode and for distributing anionic regenerant in the regeneration mode;

(g) a regenerant collector attached to said middle outlet conduit inside said vessel for removing said anionic and cationic regenerants from said vessel;

(h) a bed of cationic ion exchange resin filling the interior space of said vessel from the bottom of said vessel to approximately the location of said regenerant collector means;

(i) a bed of neutral resin resting directly on said bed of cationic resin and surrounding said regenerant collector means inside said vessel; and (j) a bed of anionic ion exchange resin resting directly on said bed of neutral resin and completely filling the remaining interior space of said vessel.

18. The apparatus of claim 17 wherein said neutral resin is of a different color than either said anionic ion exchange resin or said cationic ion exchange resin.

* * * * *

UNITED STATES PATENT AND TRADEMARK OFFICE
CERTIFICATE OF CORRECTION

PATENT NO. : 4,806,236

DATED : Feb. 21, 1989

INVENTOR(S) : McCormack

It is certified that error appears in the above-identified patent and that said Letters Patent is hereby corrected as shown below:

Column 4, line 49, "nnvention" should read --invention--.

Column 8, line 34, "anioiic" should read --anionic--.

Column 13, line 17, "j) should read --(j)-- and should be a subparagraph, including the lines following, under Claim 8;
    line 22, "(k)" should be a subparagraph, including the lines following, under Claim 8; and
    line 26, "(l)" should be a subparagraph, including the lines following, under Claim 8.

Signed and Sealed this

Twenty-ninth Day of August, 1989

Attest:

DONALD J. QUIGG

Attesting Officer

Commissioner of Patents and Trademarks